Jan. 31, 1956  R. B. REED  2,732,712
METHODS OF AND APPARATUS FOR TESTING WELDED STRIPS
Filed Nov. 23, 1951  2 Sheets-Sheet 1
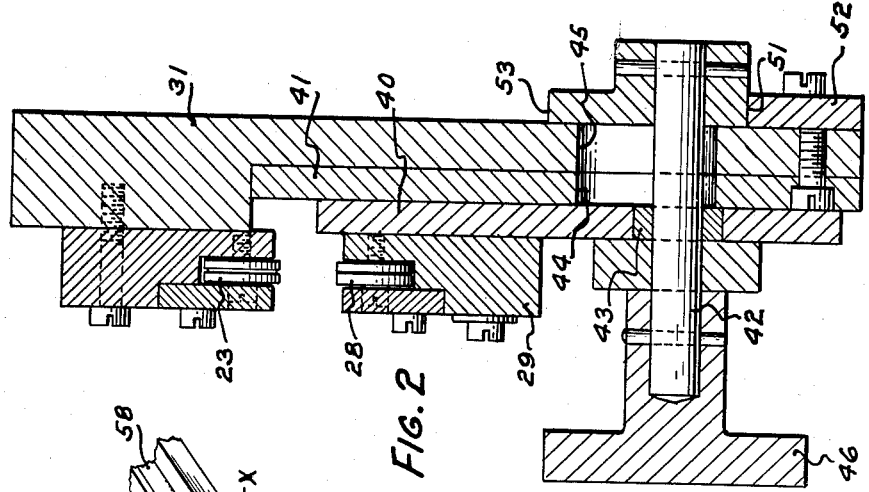
FIG. 2
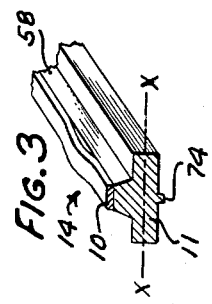
FIG. 3
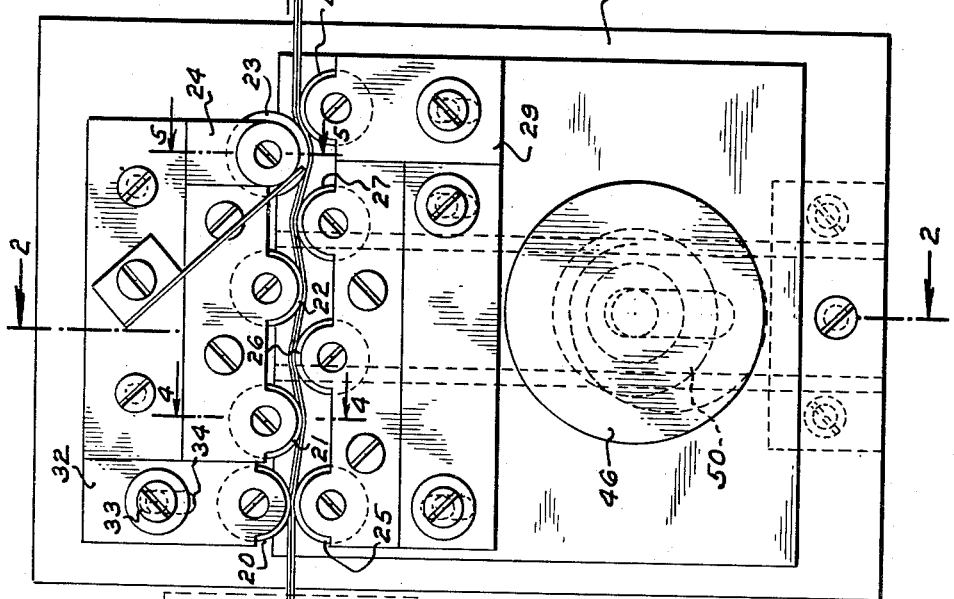
FIG. 1
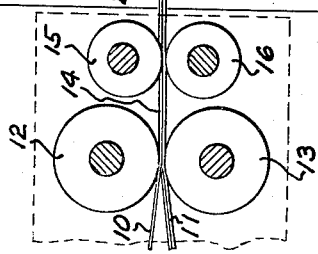
INVENTOR
R. B. REED
BY E. F. Kane
ATTORNEY Jan. 31, 1956　　　R. B. REED　　　2,732,712
METHODS OF AND APPARATUS FOR TESTING WELDED STRIPS
Filed Nov. 23, 1951　　　2 Sheets-Sheet 2
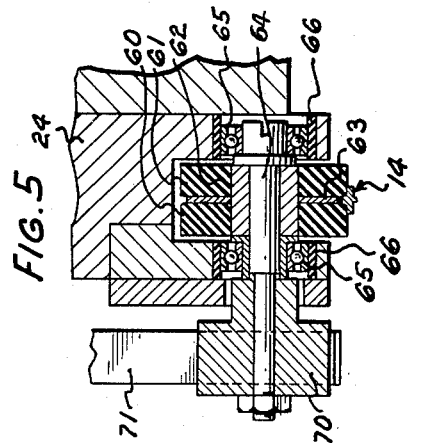
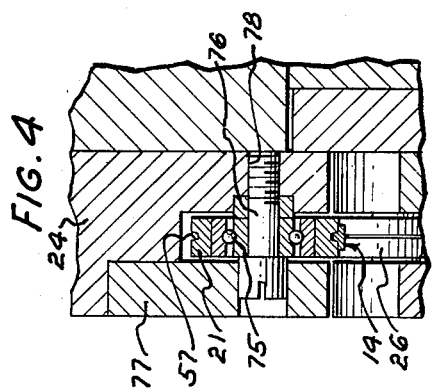
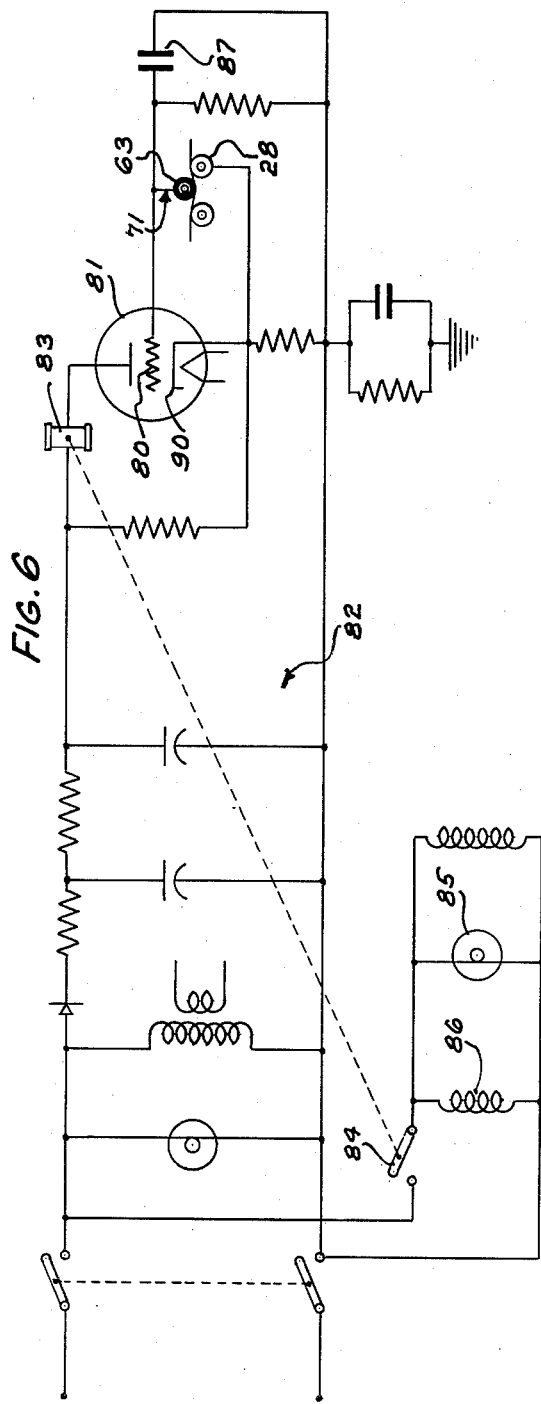
INVENTOR
R. B. REED
BY
ATTORNEY

United States Patent Office 2,732,712
Patented Jan. 31, 1956

2,732,712

METHODS OF AND APPARATUS FOR TESTING WELDED STRIPS

Robert B. Reed, Westchester, Ill., assignor to Western Electric Company, Incorporated, New York, N. Y., a corporation of New York Application November 23, 1951, Serial No. 257,727

11 Claims. (Cl. 73—100)

This invention relates to methods of and apparatus for testing welded strips, and more particularly to methods of and apparatus for testing welds between elongated strips.

In the manufacture of contacts for relays or the like, a capping of precious metal is sometimes welded to a larger base strip, and the resulting tape is cut into short lengths to be used as contacts for relays or the like. In this manufacture, it is essential that the entire length of the capping strip be welded to the other strip so that when the composite tape is cut into contact length, all the caps are secured to the bases. Furthermore, since these strips are elongated, there may be short lengths of unwelded portions of the strips which are sufficiently long to produce defective articles when cut into separate contacts, but are not sufficiently long to be readily detectible. In the past there has been no satisfactory apparatus for detecting such short length, unwelded portions of welded strips.

An object of the invention is to provide new and improved methods of and apparatus for testing welded strips.

A further object of the invention is to provide methods of and apparatus for testing welds between elongated strips.

Another object of the invention is to provide methods of and apparatus for locating short unwelded sections of elongated strips welded together.

In accordance with methods and apparatus illustrating certain features of the invention, two elongated strips of material may be welded continuously together, the resulting tape is continuously flexed to separate unwelded portions of the tape, and unwelded portions of the tape are located by measuring the strip continuously.

A complete understanding of the invention may be obtained from the following detailed description of a method and an apparatus forming specific embodiments thereof, when read in conjunction with the appended drawings, in which:

Fig. 1 is a front elevation of an apparatus forming one embodiment of the invention;

Fig. 2 is a vertical section taken along line 2—2 of Fig. 1;

Fig. 3 is a sectional, perspective view of an article processed by a method embodying the invention;

Fig. 4 is a fragmentary, vertical section taken along line 4—4 of Fig. 1;

Fig. 5 is a fragmentary, vertical section taken along line 5—5 of Fig. 1, and

Fig. 6 is a diagrammatic view of a detector circuit associated with the apparatus shown in Fig. 1.

Referring now in detail to the drawings, there is shown therein an apparatus for mounting a narrow capping strip 10 (Figs. 1 and 3) of precious metal, such as, for example, palladium, to a stronger base strip 11 of another metal, such as, for example, nickel, by means of electrodes 12 and 13 to form a contact tape 14. The tape 14 is formed continuously by rolls 15 and 16, and is then advanced continuously past grooved rolls 20, 21, 22 and 23 secured to an upper roll support 24, and grooved rolls 25, 26, 27 and 28 secured to a lower roll supporting plate 29, which are staggered with respect to one another and form a tortuous path for the contact tape 14, so that the tape is flexed alternately in opposite directions as it is advanced between these rolls.

The support 24 is secured to a fixed upright 31, and the roll 20 is carried by a roll support 32 secured adjustably to the support 21 by a screw 33 projecting through an elongated slot 34 formed in the support 32. The support 29 is secured rigidly to a plate 40 slidable along a plate 41 secured rigidly to an upright 31, and a shaft 42 mounted rotatably in a bearing 43 secured to the plate 40 also projects through elongated slots 44 and 45 formed in the plate 41 and the upright 31, respectively. The shaft 42 may be turned by a manually operable knob 46 pinned to the shaft to turn a cam 50 to move a dwell portion 51 out of engagement with a support plate 52 and move a lobe portion 53 into engagement with the plate 52. This raises the shaft 42 in the slots 44 and 45 to lift the plate 40 and the support 29 upwardly, as viewed in Fig. 2, to move the rolls 25, 26, 27 and 28 upwardly into positions in which the contact strip 14 is flexed as it passes between these rolls and the rolls 20, 21, 22 and 23, with the strip being tightly pressed between the rollers 20 and 25 and the rolls 23 and 28. The rolls 20, 21 and 22 have grooves 57 therein providing clearance for the strip 10 and a projecting portion 58 of the strip 11.

The roll 23 is composed of sapphire discs 60 and 61 (Fig. 5) having the same diameter mounted on a conductive core 62 on opposite sides of a steel disc 63. The steel disc 63 has a diameter sufficiently less than that of the discs 60 and 61 that when the discs 60 and 61 contact the tape 14 as the strip 10 enters between the discs 60 and 61, only portions of the strip 10 which are not welded to the strip 11 and have been bent away from the strip 11 contact the disc 63, and is such that all such portions of the strip 10 do contact the disc 63. The core 62 is mounted on and connected electrically to a hub or shaft 64 mounted in bearings 65—65 supported by bushings 66—66 composed of electrical insulating material. A slip ring 70 is connected to the shaft 64 electrically and mechanically, and a brush 71 gages the periphery of the slip ring 70. Each of the rollers 25, 26, 27 and 28 has a small groove 73 to provide clearance for a small bead 74 on the strip 11. The roll 21 is mounted on a radial thrust bearing 75 secured to a screw 76 threaded through a retaining plate 77 into a bore 78 formed in the support 24.

The brush 71 is connected to a grid 80 (Fig. 6), and, when an unwelded portion of the contact tape 14 is contacted by the disc 63 and the roll 28, a tube 81 supplied with power from a power source 82 is fired to energize a relay 83 and close contacts 84 thereof to illuminate a lamp 85 and energize a bell ringing coil 86. A condenser 87 maintains the bias of the grid 80 with respect to the cathode 90 sufficiently long enough for the tube to be energized.

Operation

The strips 10 and 11 are advanced continuously through the apparatus, and the electrodes 12 and 13 weld the strip 10 to the projecting portion 58 of the strip 11. The rolls 15 and 16 form the strip 10 and the portion 58 of the strip 11, and the tape 14 is advanced through the rolls 20, 21 and 22 and the rolls 25, 26 and 27 opposed thereto. The rolls 21 and 22 deflect the tape 14 downwardly and the rolls 26 and 27 deflect it upwardly. Due to the configuration of the tape 14, the neutral plane at which there is no tension and no compression is at the axis X—X (Fig. 3), which is substantially closer to the bottom of the strip 11 than the top thereof. The upward flexing is to such an extent that the portion of the tape 14 formed by the strip 10 is stretched beyond its elastic limit while the portion of the tape 14 below the line X—X is not permanently deformed. Then, when the tape is flexed downwardly, the welded portions of the strip 10 are compressed back to their previous dimension while the unwelded portions buckle without shortening and form humps separated from the strip 11.

As the humps travel around the roll 23, they are engaged by the disc 63, which completes a circuit from the roll 23 to the roll 28 to actuate the tube 81. This causes the lamp 85 to be lighted and a bell to be rung so that the portion of the tape 14 containing the hump is marked.

The above-described method and apparatus thoroughly test welds, and positively locate unwelded portions so that these portions may be cut out of the tape 14. The apparatus may be strung up with little effort merely by lowering the rolls 25, 26, 27 and 28, inserting the tape 14 and raising these rolls.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. The method of testing welded strips, which comprises continuously flexing a bi-metallic strip having welded components of unequal strength sufficiently to cause slight humps in unwelded portions of the weaker component, and then detecting any humps in the flexed strip.

2. The method of testing a welded bi-metallic contact tape having a wide supporting strip and a narrow contact cap welded thereto, which comprises flexing each portion of such a strip to alternately stretch and compress the cap, whereby unwelded portions of the cap buckle to form humps, and then detecting any humps in the strip.

3. The method of testing welds between a wide base strip having a T-shaped cross-section and a narrow capping strip welded to the stem of the T, which comprises alternately flexing such a composite article in opposite directions to such an extent that the portions of the capping strip securely welded to the base strip are alternately stretched and compressed beyond their elastic limit and the portions of the capping strip not welded to the base strip are alternately stretched beyond their elastic limit and are buckled to form humps, and detecting any humps in the strip.

4. The method of testing welds of a tape between a narrow capping strip welded to the end of the stem of a strip of T-shaped cross-section having a wide, thick base, which comprises alternately flexing the tape in opposite directions about an axis transverse to the longitudinal axis of the strip and parallel to the plane of the weld to such an extent that the capping strip is alternately stretched beyond its elastic limit and the welded portions of the capping strip are compressed beyond their elastic limit and the unwelded portions of the capping strip are buckled, and detecting any humps in the strip.

5. The method of testing welds of a tape between a narrow, thin capping strip of predetermined strength welded to the end of the stem of a wide, thick base strip of T-shaped cross-section and substantially greater strength, which comprises advancing such a strip along a tortuous path to alternately flex the tape in opposite directions about an axis transverse to the longitudinal axis of the tape and parallel to the plane of the weld to such an extent that the capping strip is alternately stretched beyond its elastic limit and the welded portions of the capping strip are compressed beyond their elastic limit and the unwelded portions of the capping strip are buckled, and detecting any humps in the strip.

6. An apparatus for testing welded strips, which comprises means for flexing a bi-metallic strip having welded components of unequal strengths, whereby unwelded portions of the weaker components are formed into humps, and means mounted adjacent to the flexing means for detecting humps in the strip after it is flexed.

7. An apparatus for testing a welded bi-metallic contact tape having a wide, strong supporting strip and a narrow, weak contact cap, which comprises a series of rolls so positioned as to laterally flex such a tape with the cap alternately on the outside of the curve and on the inside of the curve as the tape is advanced through the rolls, means for advancing the tape through the rolls, and means mounted at the exit end of the series of rolls in the path of the tape for detecting any humps in the tape as it is so advanced.

8. An apparatus for testing a welded bi-metallic contact tape having a wide, strong supporting strip and a narrow, weak contact cap, which comprises a series of rolls so positioned as to laterally flex such a tape with the cap alternately on the outside of the curve and on the inside of the curve as the tape is advanced through the rolls, means for advancing the tape through the rolls, and electrical circuit means including sapphire insulating discs of a predetermined diameter, a conductive disc smaller in diameter than the sapphire discs positioned between the sapphire discs and engaging the sapphire discs for contacting buckled portions of the cap, means mounting the discs at the end of the series of rolls in the path of the tape, and indicating means responsive to contacts of the conductive disc by the buckled portions of the cap.

9. An apparatus for testing a tape composed of a pair of welded tapes of unequal tensile strengths and of different widths, which comprises a series of rolls mounted on spaced axes, a second series of rolls, means mounting the second series of rolls in positions staggered with respect to the rolls of the first-mentioned series, selectively operable means for moving the roll-mounting means between a flexing position in which the rolls form a tortuous path for such a tape and a stringing up position in which the rolls of the second series are separated from the rolls of the first-mentioned series, and means located in the path of the tape at the end of the series of rolls for detecting any humps in the tape.

10. An apparatus for testing a tape composed of a pair of welded tapes of unequal tensile strengths and of different widths, which comprises a series of rolls mounted on spaced axes, a second series of rolls, means mounting the second series of rolls in positions staggered with respect to the rolls of the first mentioned series, selectively operable means for moving the roll-mounting means between a flexing position in which the rolls form a tortuous path for such a tape and a stringing up position in which the rolls of the second series are separated from the rolls of the first-mentioned series, and electrical circuit means including a roll mounted at the exit end of said path having a groove therein for receiving only the narrower tape, said groove being of such a depth that unbuckled portions of the narrower tape do not touch the bottom of the groove and buckled portions thereof do touch the bottom of the groove, said last-mentioned roll being electrically conductive at the bottom of said groove and the peripheral portions of said last-mentioned roll being electrically non-conductive, and indicating means responsive to contact of a buckled portion of the narrower tape with the bottom of the groove.

11. An apparatus for testing a tape composed of a pair of welded tapes of unequal tensile strengths and of different widths, which comprises a series of rolls mounted on spaced axes, a second series of rolls, means mounting the second series of rolls in positions staggered with respect to the rolls of the first-mentioned series, selectively operable means for moving the roll-mounting means between a flexing position in which the rolls form a tortuous path for such a tape and a stringing up position in which the rolls of the second series are separated from the rolls of the first-mentioned series, a gauging roll located at the exit end of said path having a groove therein for receiving the narrower tape, said groove being of such a depth that unbuckled portions of the narrower tape do not touch the bottom of the groove and buckled portions thereof do touch the bottom of the groove, said roll being provided with rims forming the side walls of the groove composed of electrical insulating material and a central portion forming the bottom of the groove composed of electroconductive material, electroconductive means for contacting the side of the wider tape opposite to the gauging roll, and electrical indicating means responsive to contact of a buckled portion of the narrower tape with the bottom of the groove.

References Cited in the file of this patent

UNITED STATES PATENTS

| | | |
|---|---|---|
| 889,993 | Vaughan et al. | June 9, 1908 |
| 1,857,669 | Sundback | May 10, 1932 |
| 2,032,989 | Kenney et al. | Mar. 3, 1936 |
| 2,144,915 | Derby | Jan. 24, 1939 |
| 2,283,730 | Gardner | May 19, 1942 |
| 2,375,209 | Basquin | May 8, 1945 |
| 2,469,608 | Phillimore | May 10, 1949 |
| 2,482,381 | Stevens et al. | Sept. 20, 1949 |

FOREIGN PATENTS

| | | |
|---|---|---|
| 3,659 | Great Britain | 1880 |